US006205209B1

United States Patent
Goldberg et al.

(10) Patent No.: US 6,205,209 B1
(45) Date of Patent: Mar. 20, 2001

(54) NETWORK THAT PROVIDES APPLICATIONS COLLABORATION

(75) Inventors: Randy G. Goldberg, Princeton; Robert Edward Markowitz, Glen Rock; Kenneth H. Rosen, Middletown; Steven Charles Salimando, Little Silver, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/139,228

(22) Filed: Aug. 25, 1998

(51) Int. Cl.[7] .................................................. H04M 11/00
(52) U.S. Cl. ..................... 379/93.15; 379/93.21; 348/15
(58) Field of Search ........................ 348/15, 17; 370/260, 370/265; 379/93.15, 93.21; 709/202, 204, 205

(56) References Cited

U.S. PATENT DOCUMENTS

| | | | |
|---|---|---|---|
| 4,796,293 | * 1/1989 | Blinken et al. | 379/202 |
| 5,481,603 | 1/1996 | Gutierrez et al. | 379/221 |
| 5,689,553 | 11/1997 | Ahuja et al. | 379/202 |
| 5,854,893 | * 12/1998 | Ludwig et al. | 709/205 |

* cited by examiner

Primary Examiner—Duc Nguyen
Assistant Examiner—Melur Ramakrishnaiah
(74) Attorney, Agent, or Firm—Kenyon & Kenyon

(57) ABSTRACT

A collaborative application system initiates a communication session over a network. The collaborative application system receives an identity of a called party and an identity of a collaborative application from a calling party. The calling party participates in the communication session at a first endpoint and the called party participates in the communication session at a second endpoint. Further, the collaborative application system determines a first endpoint type and a second endpoint type and selects a first version of the collaborative application based on the first endpoint type and a second version of the collaborative application based on the second endpoint type. The collaborative application system then retrieves and makes available the first version of the application to the calling party and second version of the application to the called party.

21 Claims, 2 Drawing Sheets

NETWORK THAT PROVIDES APPLICATIONS COLLABORATION

FIELD OF THE INVENTION

The present invention is directed to a communication network. More particularly, the present invention is directed to a communication network that provides application collaboration between a diverse group of endpoints.

BACKGROUND OF THE INVENTION

Popular computer applications include word processors, spreadsheets and organizers. These applications typically involve a single user interacting with a computer. However, frequently there is a need for multiple users to interact or collaborate with an application at the same time over a communication network. For example, two or more remote users may wish to collaborate with a word processor in order to create a single document.

When two or more users wish to collaborate with an application, each user must usually have specialized software and/or specialized hardware to support that application. This can increase the costs to each user, and require each user to have advanced technical skills in order to setup and operate the specialized software and hardware. Further, most application collaboration occurs on one specific type of equipment (e.g., a personal computer). Therefore, even more specialized software must be implemented by the users if, for example, one user on a personal computer wishes to collaborate on an application with a user on a wireless personal data assistant ("PDA") such as the PalmPilot from 3Com Corp.

Based on the foregoing, there is a need for a method and apparatus that facilitates application collaboration between users across a network using diverse types of devices.

SUMMARY OF THE INVENTION

One embodiment of the invention is a collaborative application system for initiating a communication session over a network. The collaborative application system receives an identity of a called party and an identity of a collaborative application from a calling party. The calling party participates in the communication session at a first endpoint and the called party participates in the communication session at a second endpoint. Further, the collaborative application system determines a first endpoint type and a second endpoint type and selects a first version of the collaborative application based on the first endpoint type and a second version of the collaborative application based on the second endpoint type. The collaborative application system then retrieves and makes available the first version of the application to the calling party and second version of the application to the called party.

The collaborative application system allows multiple participants during the communication session to collaborate with the application using diverse endpoints. The application and billing are managed by the collaborative application system. Therefore, each participant does not require specialized software and equipment, and the participants can be billed for the application usage based on one or more billing variables. Further, the collaborative application system automatically presents the application user interface that is appropriate for each participant's endpoint.

DETAILED DESCRIPTION

Figure 1:
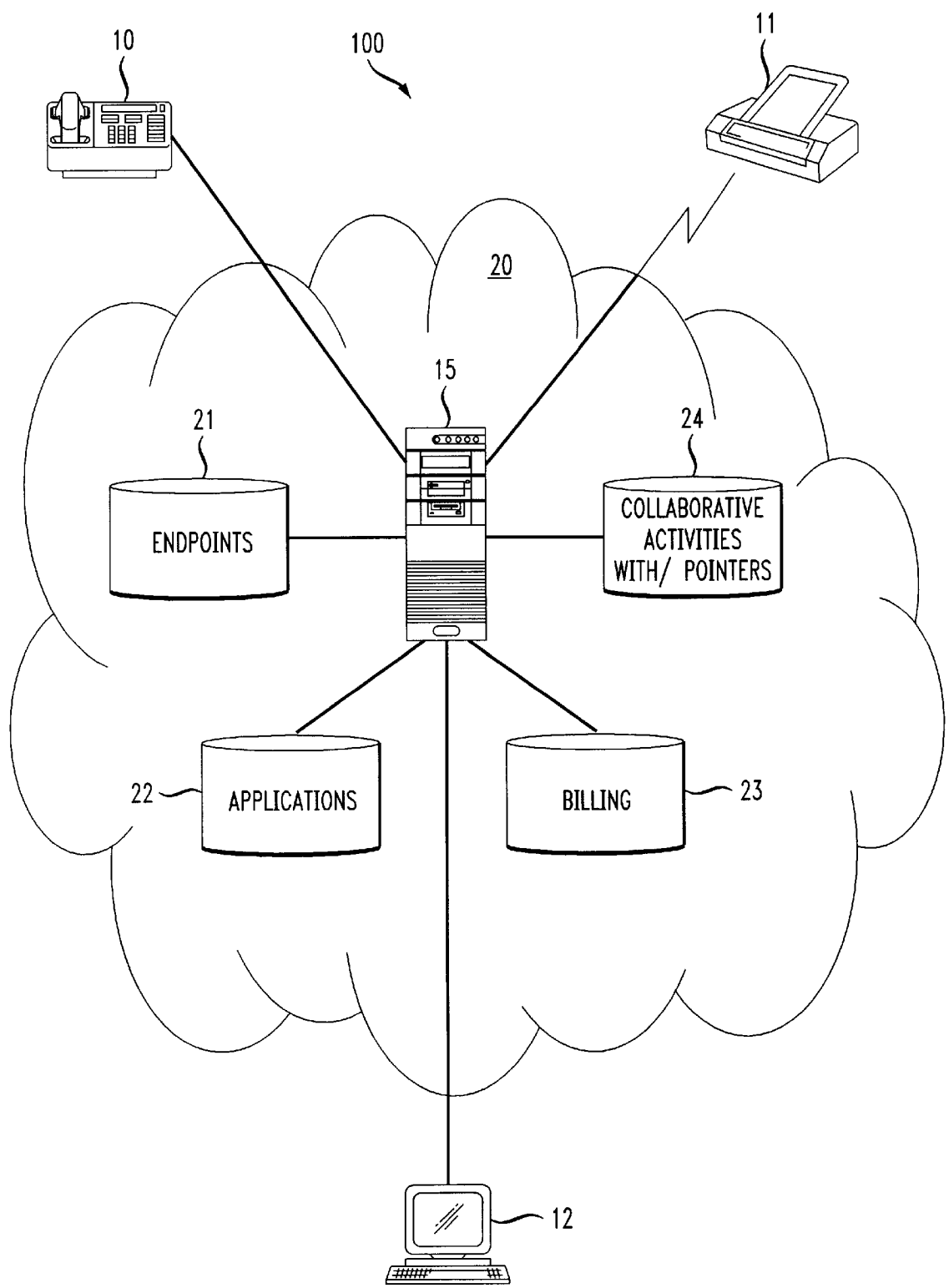
FIG. 1 illustrates an exemplary system that implements one embodiment of the present invention.

One embodiment of the present invention allows users at various devices to easily collaborate on an application in conjunction with initiating a communication session. FIG. 1 illustrates an exemplary system 100 that implements one embodiment of the present invention.

System 100 includes a network 20. Network 20 can be any network that enables one party to initiate and complete a communication session to another party, and also to transmit data. A communication session allows two or more parties to communicate with each other. Examples of a communication session include a telephone call over the public switched telephone network ("PSTN"), a telephone call over both the PSTN and the Internet, and an exchange of data over a data network such as a local area network. Network 20 can be a circuit-switched communications network, a packet-switched data network, or a combination of both. For example, in one embodiment of the present invention, network 20 is the PSTN. Other examples of network 20 include a local area network, the Internet, or an intranet.

Two or more devices 10–12, referred to as "endpoints", are coupled to network 20. The users of the present invention use one of the endpoints 10–12 to collaborate on applications. Endpoints 10–12 can be any type of device that allows a user to initiate or participate in a communication session and to collaborate on an application.

Endpoint 10 is an analog telephone that is coupled to network 20 through a local exchange carrier ("LEC"). Endpoint 11 is a PDA or laptop computer that is coupled to network 20 through a wireless Internet protocol ("IP") such as Cellular Digital Packet Data ("CPDP"). Endpoint 12 is a personal computer that is coupled to network 20 through a dial-up Internet connection to an Internet Service Provider ("ISP"). Other types of endpoints can be coupled to network 20 and included in system 100.

A network server or node 15 is located within network 20. Network node 15 includes a processor and memory, and executes the steps of the present invention described in conjunction with FIG. 2. In one embodiment, network node 15 includes an out-dialer for dialing telephone numbers.

Network node 15 is coupled to a plurality of storage devices 21–24. Storage device 21 stores information regarding each endpoint 10–12 included in system 100. The information includes the type of endpoint, a telephone number associated with the endpoint, etc.

Storage device 22 stores the collaborative applications that are executed by network node 15. Collaborative applications allow two or more users to simultaneously interact with an application. Examples of collaborative applications include word processors, games, spreadsheets, and calender/scheduling. Therefore, for example, two or more users can edit and create the same document using a collaborative word processor, or two or more users can be involved in the same collaborative game playing against each other.

Each collaborative application has different versions that include user interfaces tailored to different types of endpoints. For example, if the collaborative application is a word processor, the version for personal computer endpoint 12 is a standard personal computer word processor such as Microsoft Word. The version for telephone endpoint 10 includes speech recognition so that a spoken voice by a user at endpoint 10 can be translated into typed words. The telephone endpoint 10 version also includes a text-to-speech converter so that words entered in the word processor can be read to the user. The version for PDA endpoint 11 includes handwriting recognition so that handwritten words at PDA 11 can be translated into typed words. Therefore, users at endpoints 10–12 can collaborate on a single word processing document through different types of endpoints using different input techniques (e.g., pen-based input, speech input, typed input, etc.).

A "collaborative" communication session is a communication session during which a collaborative application is executed. Storage device 23 stores billing information for each collaborative communication session through network node 15. The billing information includes the total cost of the collaborative communication session and the billing variables used to determine the cost of the collaborative communication session.

Storage device 24 stores all collaborative activity for each collaborative communication session and a pointer so that the activity can be easily retrieved and resumed in a later session. For example, if during a collaborative communication session a word processing document is drafted by multiple users, the end product is stored on storage device 24. The same document, through a pointer, can later be retrieved and revised during a later collaborative communication session.

Figure 2:
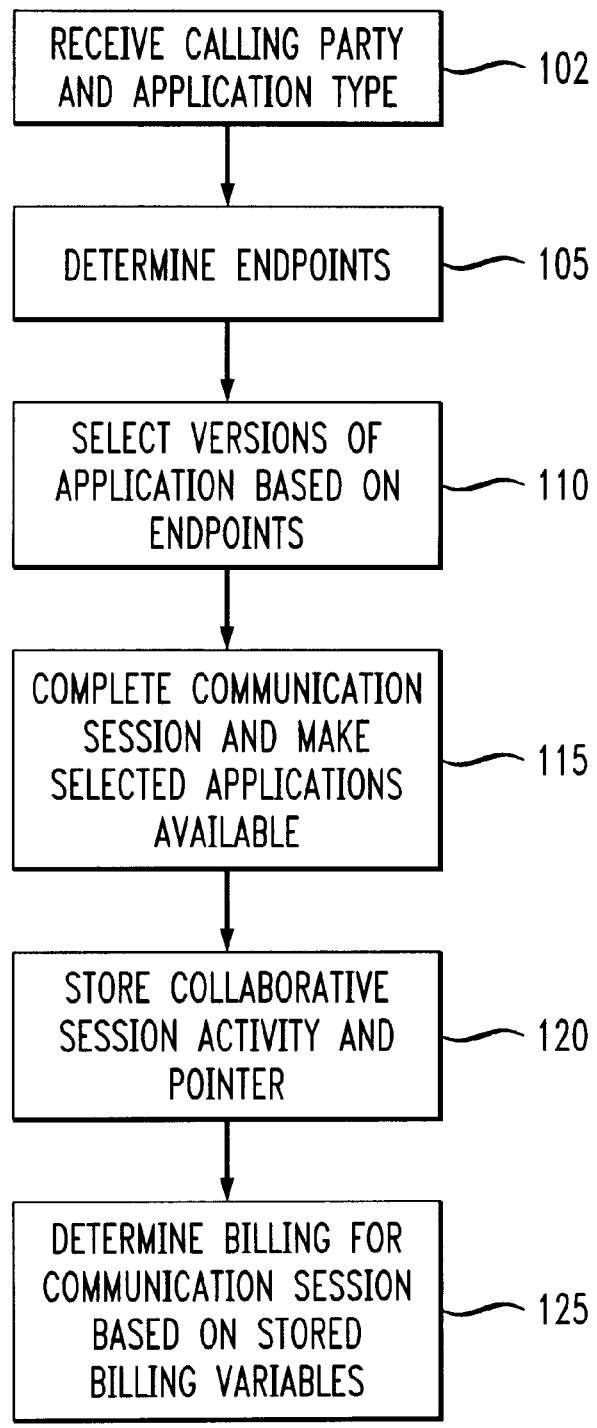
FIG. 2 is a flowchart illustrating the steps performed by a network node in one embodiment of the present invention when a collaborative communication session is initiated.

FIG. 2 is a flowchart illustrating the steps performed by network node 15 in one embodiment of the present invention when a collaborative communication session is initiated. A collaborative communication session is initiated by one user (the "calling party") at one of the endpoints 10–12 to another user (the "called party") at a different endpoint 10–12 through network node 15. The communication session is initiated differently depending on the type of endpoint the calling party is using.

For example, if the calling party is using telephone 10, the calling party can call a telephone number associated with network node 15. After connecting with network node 15, in one embodiment the calling party can specify the collaboration application desired (e.g., word processing, game, etc.) and the identity of one or more called parties. An interactive voice response system in network node 15 can be used to receive the information from the calling party. In another embodiment, the telephone number is linked with a specific application, and therefore the calling party is not required to specify the application desired.

In contrast, if the calling party is using personal computer 12 or PDA 11, an icon can be selected that corresponds to the desired application and the identity of the one or more called parties can be typed in or selected. The endpoint can then connect to network node 15.

At step 102, network node 15 receives the identity of the called party or parties, and the type of application for the collaborative session.

At step 105, network node 15 determines the types of endpoints that will participate in the collaborative session based on the endpoint information stored in storage device 21. In one embodiment, each user is associated with a single type of device. Therefore, if network node 15 knows the identity of the calling party and the called parties, the types of endpoints for each user can be easily determined. In another embodiment, a user may be associated with various types of devices. In this embodiment, the communication session must first be completed (at step 115) to determine what type of endpoints are involved.

At step 110, network node 15 selects the version or versions of the collaborative application based on the types of endpoints participating in the communication session. For example, if the communication session is between two personal computers, one version of the collaborative application tailored to personal computers will be selected. However, if the communication session is between a telephone and a personal computer, one version of the collaborative application tailored to telephones and one version of the collaborative application tailored to personal computers will be selected. The versions of the application are retrieved from applications storage device 22.

At step 115, network node 15 completes the communication session between the two or more endpoints. In one embodiment, an out-dialer dials the telephone numbers for each called party. In another embodiment, each called party can dial into network node 15, and network node 15 acts as a bridge device to complete the communication session. When a telephone call is not involved in the communication session, the communication session is completed when the calling party and called party can exchange data with network node 15. As part of the communication session completion process, the selected collaborative application is made available to each participant in the communication session. The participants in the communication session can begin to collaborate on the application when the application has been made available.

In one embodiment, the application is completely executed by network node 15, and each endpoint functions as an input/output device or non-intelligent terminal. In another embodiment, part of the application can be downloaded to and executed by an endpoint if the endpoint has the necessary capability (i.e., the endpoint includes a processor and storage). However, the primary collaborative activity will be executed by network node 15.

At step 120, network node 15 stores the collaborative activity during the collaborative communication session to storage device 24. The activity includes all input to the collaborative application. Further, a pointer is stored in storage device 24 that allows the collaborative communication session to be resumed in a subsequent communication session. In one embodiment, the activity and results of the collaborative communication session can be downloaded to each collaborative communication session participant from storage device 24, can be accessible from a Web site, or can be sent to each participant in the form of an electronic mail.

At step 125, after the collaborative communication session has ended, the billing for the collaborative communication session is determined. The cost of the collaborative communication session is based on multiple billing variables that are stored in storage device 24. The billing variables allow the billing for the collaborative communication session to be tailored many different ways. Examples of billing variables include: the length of time of the collaborative communication session; the number of data packets transmitted during the collaborative communication session; the type of endpoints involved in the collaborative communication session; the type and version of the application used during the collaborative communication session; the functions of the application used during the collaborative communication session; the time of day of the collaborative communication session; and predetermined licensing arrangements a user has with a collaborative application.

As disclosed, the present invention allows multiple participants during a communication session to collaborate with an application using diverse endpoints. The application and billing are managed by a network node that completes the communication session. Therefore, each participant does not require specialized software and equipment, and the participants can be billed for the application usage based on one or more billing variables. Further, the network node automatically presents the application user interface that is appropriate for each participant's endpoint.

Because the endpoints can be diverse, the method of connection to the communication session also can be diverse. For example, one participant may be connected via a telephone call while one participant may be connected via a data session over a packet network. However, it is not necessary for any of the participants to know or care what type of endpoints or type of connections the other participants are using during the communication session.

Several embodiments of the present invention are specifically illustrated and/or described herein. However, it will be appreciated that modifications and variations of the present invention are covered by the above teachings and within the purview of the appended claims without departing from the spirit and intended scope of the invention.

For example, the functionality of network node 15 can be implemented among multiple different network nodes across different networks. However, the network nodes must somehow be coupled to each other.

What is claimed is:

1. A method of initiating a communication session over a network said method comprising the steps of:

(a) receiving an identity of a called party and an identity of a collaborative application from a calling part, wherein the calling party participates in the communication session at a first endpoint and the called party participates in the communication session at a second endpoint;

(b) determining a first endpoint type and a second endpoint type;

(c) selecting a first version of the collaborative application based on the first endpoint type and a second version of the collaborative application based on the second endpoint type, said first version differing from said second version; and (d) retrieving and making available the first version of the application to the calling party and the second version of the application to the called party.

2. The method of claim 1, wherein step (d) comprises the step of:

executing the first version and the second version.

3. The method of claim 1, further comprising the step of:

(e) storing collaborative activity of the called party and the calling party during the communication session.

4. The method of claim 3, further comprising the step of:

determining a cost of the communication session based on at least one billing variable.

5. The method of claim 4, wherein the billing variable comprises the first endpoint type and the second endpoint type.

6. The method of claim 4, wherein the billing variable comprises a type of the collaborative application.

7. The method of claim 1, wherein the first endpoint type is a telephone and the second endpoint type is a computer.

8. The method of claim 1, wherein the first endpoint type is a personal data assistant.

9. The method of claim 1, wherein the network comprises a Public Switched Telephone Network and an Internet.

10. The method of claim 1, wherein the first version and the second version are identical.

11. The method of claim 1, wherein the communication session comprises a telephone call.

12. A system for providing a communication session over a network, said system comprising:

a network node;

at least two endpoints adapted to be coupled to said network node;

a first database storing two or more versions of a collaborative application; and a second database storing types of all endpoints adapted to be coupled to said network node;

wherein said network node:

receives an identity of a called party and an identity of a collaborative application from a calling party, wherein the calling party participates in the communication session at a first endpoint and the called party participates in the communication session at a second endpoint;

queries said second database to determine a first endpoint type and a second endpoint type;

queries said first database and retrieves a first version of the collaborative application based on the first endpoint type and a second version of the collaborative application based on the second endpoint type, wherein said first version differs from said second version; and executes the first version of the application for use by the calling party at the first endpoint and the second version of the application for use by the called party at the second endpoint.

13. The system of claim 12, wherein said network node:

stores collaborative activity of the called party and the calling party during the communication session.

14. The system of claim 12, wherein said network node:

determines a cost of the communication session based on at least one billing variable.

15. The system of claim 12, wherein the first endpoint type is a telephone and the second endpoint type is a computer.

16. The system of claim 12, wherein the network comprises a Public Switched Telephone Network and an Internet.

17. The system of claim 12, wherein the communication session comprises a telephone call.

18. A method of collaborating on an application, said method comprising the steps of:

(a) receiving a request to establish a communication session from a first user at a first endpoint, said request including an identity of a second user at a second endpoint;

(b) determining a first endpoint type and a second endpoint type;

(c) retrieving first version of the application based on the first endpoint type and a second version of the application based on second endpoint type, said first version differing from said second version;

(d) establishing the communication session between the first user and the second user; and (e) executing the a first version of the application so that it is available to the first user at the first endpoint and a second version of the application so that it is available to the second user at the second endpoint during the communication session.

19. The method of claim 18, wherein said request is received over a telephone call.

20. The method of claim 19, wherein said communication session comprises a telephone call between the first user and the second user.

21. The method of claim 20, wherein said first endpoint type is a telephone and said second endpoint type is a data communication device.

* * * * *

UNITED STATES PATENT AND TRADEMARK OFFICE
CERTIFICATE OF CORRECTION

PATENT NO. : 6,205,209 B1  
DATED : March 20, 2001  
INVENTOR(S) : Randy G. Goldberg, Robert Edward Markowitz, Kenneth H. Rosen, Steven Charles Salimando It is certified that error appears in the above-identified patent and that said Letters Patent is hereby corrected as shown below:

<u>Column 5,</u>
Line 33, of a collaborative application from a calling party,

Signed and Sealed this

Twenty-fifth Day of September, 2001

*Attest:*

NICHOLAS P. GODICI
*Acting Director of the United States Patent and Trademark Office*

*Attesting Officer*

UNITED STATES PATENT AND TRADEMARK OFFICE
CERTIFICATE OF CORRECTION

PATENT NO. : 6,205,209 B1
DATED : March 20, 2001
INVENTOR(S) : Randy G. Goldberg, Robert Edward Markowitz, Kenneth H. Rosen, Steven Charles Salimando It is certified that error appears in the above-identified patent and that said Letters Patent is hereby corrected as shown below:

Column 5,
Line 34, wherein the calling part participates in the communication

Signed and Sealed this

Ninth Day of October, 2001

*Attest:*

NICHOLAS P. GODICI
*Attesting Officer* *Acting Director of the United States Patent and Trademark Office*